(12) United States Patent
Breunig

(10) Patent No.: US 8,475,857 B2
(45) Date of Patent: Jul. 2, 2013

(54) METHOD FOR THE ENERGY-SAVING CONTROL OF A FOOD PROCESSING PROCESS OR A PROCESSING CHAMBER CLEANING PROCESS AND COOKING DEVICE USED THEREFOR

(75) Inventor: Manfred Breunig, Schongau (DE)

(73) Assignee: Rational AG (DE)

( * ) Notice: Subject to any disclaimer, the term of this patent is extended or adjusted under 35 U.S.C. 154(b) by 421 days.

(21) Appl. No.: 12/697,747

(22) Filed: Feb. 1, 2010

(65) Prior Publication Data

US 2010/0183780 A1 Jul. 22, 2010

(30) Foreign Application Priority Data

Aug. 1, 2007 (DE) .................. 10 2007 036 513

(51) Int. Cl.
*A01K 43/00* (2006.01)
(52) U.S. Cl.
USPC ............... 426/231; 426/523; 99/326; 134/18
(58) Field of Classification Search
USPC ................. 426/523, 231; 134/18; 99/326
See application file for complete search history.

(56) References Cited

U.S. PATENT DOCUMENTS

| 4,682,013 A | 7/1987 | Andre et al. |
| 5,171,974 A | 12/1992 | Koether et al. |
| 6,299,921 B1 * | 10/2001 | Loffler et al. ............. 426/233 |
| 6,753,027 B1 | 6/2004 | Greiner et al. |
| 2008/0280000 A1 | 11/2008 | Breunig et al. |

FOREIGN PATENT DOCUMENTS

| CH | 678996 | 11/1991 |
| DE | 4115489 | 11/1992 |
| DE | 19718399 | 11/1998 |
| DE | 19813550 | 9/1999 |
| DE | 19945021 | 4/2001 |
| DE | 102005046716 | 4/2007 |
| DE | 102007036513 | 2/2009 |
| EP | 1989978 | 11/2008 |
| JP | 2007127382 | 5/2007 |

* cited by examiner

Primary Examiner — Drew E. Becker
Assistant Examiner — Preston Smith
(74) Attorney, Agent, or Firm — Jones Day

(57) ABSTRACT

Computer-implemented systems and methods are provided for the energy-saving control of at least one process in a food processing device including a processing chamber, at least one processing device, and a control or regulating device. The control or regulating device can reduce the duration of at least the first process step or the duration of regulation in the first processing step or switch off the processing device during at least a part of the processing step to save energy, based on at least one first variable relating to the climate in the processing chamber or at least one second variable relating to the processing device or at least one third variable relating to the food item to be processed or at least one fourth variable relating to a degree of soiling of the processing chamber, during at least one second processing step directly after the first processing step.

7 Claims, 3 Drawing Sheets

METHOD FOR THE ENERGY-SAVING CONTROL OF A FOOD PROCESSING PROCESS OR A PROCESSING CHAMBER CLEANING PROCESS AND COOKING DEVICE USED THEREFOR

CROSS-REFERENCE TO RELATED APPLICATIONS

The present application is a continuation of international patent application No. PCT/DE2008/001239, entitled "METHOD FOR THE ENERGY-SAVING CONTROL OF A FOOD PROCESSING PROCESS OR A PROCESSING CHAMBER CLEANING PROCESS AND COOKING DEVICE USED THEREFOR," filed on Jul. 30, 2008. This application and the international patent application claim priority from the German Patent Application No. 10 2007 036 513.8, filed on Aug. 1, 2007. All of these are hereby incorporated into the present application by reference.

BACKGROUND

1. Technical Field

The present invention relates to a method for the energy-saving control of at least one process in a food processing apparatus comprising a processing chamber, at least one processing device, and a control or regulating device, and to a cooking apparatus for carrying out such a method.

2. Description of the Related Art

A cooking method is described in EP 07 009 155 for a rolling feed of a cooking apparatus with food items, wherein energy optimization is achieved in that a user is shown which food item or foodstuff is to be loaded into which processing level of a cooking chamber, or to be removed from the cooking chamber.

DE 41 15 489 A1 discloses a further method of this type in which a device ends a cooking procedure when an adjustable end value, such as a baking period or end core temperature, is reached, and a device for switching off heating energy before the set end value is reached. Here, it is known that after an energy saving button has been activated, a time point for switching off heating energy which lies before the point at which the end value which is set using a timer is reached, is calculated by a control circuit, for which purpose the control circuit obtains signals from a temperature sensor skewer and the time switch, in order to activate a heating element accordingly.

A method for operating an electric heating apparatus with which at least one container is to have its state brought to an end value by heating is known from DE 198 13 550 A1, wherein the end value is entered into the electric heating apparatus. Power release to a heating device essentially depends on sensor data which are determined by means of at least one sensor which is assigned to the container, and the power release is controlled on the basis of preset data and the end value according to a specified control procedure until the sensor data lie in a specified range, and subsequently, the power release is controlled on the basis of the sensor data.

DE 34 47 296 C1 discloses a device for controlling a cooking process in a pressure steam cooker which is heated using an electric heating element. By determining values of the temperature-time characteristic curve in a heating phase, the inertia of the system is used by switching off the heating element prematurely in order to keep to the desired cooking time in the pressure steam cooker in an energy-saving way.

DE 10 2005 046 716 A1 discloses a method for closed or open-loop control of a cooking apparatus in which the position of an item of food to be cooked in a cooking device is recorded and a cooking process in the cooking device at the location of the item of food to be cooked can be controlled in an energy-saving manner, and in such a manner that the cooking result is optimised. On completion of such a cooking method, a cleaning method can take place in which the regions in which the item of food to be cooked and any substances which may have been emitted from the food were located are cleaned in a targeted manner, which in turn leads to a saving in energy.

A core temperature-controlled cooking device is known from DE 199 45 021 A1 in which the energy consumption can be determined and a device for supplying energy can be set in dependence on measurement values. In this known method, the core temperature of an item of food to be cooked is controlled as well as possible to a pre-determined target value. If the method is subdivided into several time intervals, as described in DE 197 18 399 A1, in order to, for example, achieve not only a set core temperature, but also a set degree of browning, at the end of the method, then, at a change between time intervals, i.e. at the end of a first time interval, heating can continue, or steam can continue to be produced, for example, even though in the subsequent, second time interval, a lower temperature or a lower degree of humidity is required than in the first time interval. This serves primarily to accelerate the process, but in fact is also an unnecessary use of energy.

SUMMARY

The object of the present invention is to further develop the method of the above type in such a manner that energy optimization is achieved.

This object can be achieved, for example, by the process being divided into a plurality of processing steps, wherein a first processing step is selected as one of these processing steps, and to save energy, the duration of at least the first processing step or the duration of control in the first processing step can be reduced and/or the processing device can be switched off during at least a part of the first processing step, by the control or regulating device in dependence on at least one first variable relating to the climate in the processing chamber and/or at least one second variable relating to the processing device and/or at least one third variable relating to an item of food to be treated and/or at least one fourth variable relating to the degree of soiling of the processing chamber, respectively during at least one second processing step which is directly subsequent to the first processing step.

It can be provided herein that the process is selected as a food processing process or a processing chamber cleaning process, wherein during a food processing process, food in the processing chamber can preferably be subjected by means of the processing device to dry heat and/or humid heat and/or microwaves for cooking purposes, at least during the first processing step, and/or during a processing chamber cleaning process, the processing chamber can preferably be subjected to at least one cleaning agent, in particular in the form of a fluid and/or heat for the purpose of removing lime scale and/or dirt.

The invention can also include that the first variable be determined from the temperature, the humidity and/or the volume flow of the atmosphere in the processing chamber and/or the second variable be determined from the energy supply to the processing device and/or the third variable be determined from the degree of cooking of the food, wherein the degree of cooking is preferably determined from the core temperature, the cooking variable, the pH value and/or the degree of browning, and/or the fourth variable be determined from the composition of a cleaning liquid which is circulated in or through the processing chamber.

Exemplary embodiments of the invention can include that, at the start of the method and/or by means of the control or regulating device, the first processing step is assigned a first target value of at least a first processing parameter, and the second processing step is assigned a second target value of at least a second processing parameter, the actual value of the first processing parameter is captured in the first processing step by means of at least one sensor device, and is controlled to the first target value by means of the control or regulating device over at least a part of the duration of the first processing step, and the second target value is taken into account during this control in the first processing step, at least for certain periods of time, wherein the first processing parameter is determined from the first, second, third and/or fourth variable during the first processing step, and/or the second processing parameter is determined from the first, second, third and/or fourth variable during the second processing step.

It can be provided herein that the controlling of the actual value of the first processing parameter becomes shorter than the duration of the first processing step when the second target value of the second processing parameter, in particular in terms of its magnitude, is smaller than the first target value of the first processing parameter.

Furthermore, it can be provided that the duration of the first processing step be shortened when the second target value of the second processing parameter, in particular in terms of its magnitude, is smaller than the first target value of the first processing parameter.

It can also be provided that the shortening of the duration of control in the first processing step or the shortening of the duration of the first processing step can depend on the difference between the first target value and the second target value.

It can also be provided that the shortening of the duration of control in the first processing step is selected in cases when the food processing step is core temperature-driven, or the shortening of the duration of the first food processing step is selected in cases when the food processing step is time-driven.

It can also be provided that the shortening of the duration of the first processing step or of the duration of control in the first processing step and/or the switching off of the processing device during at least a part of the first processing step occur in dependence on the first, second, third and/or fourth variable prior to the first processing step.

Furthermore it is proposed that an energy saving mode, the process, the first processing step, the second processing step, the first variable, the second variable, the third variable, the fourth variable, the first processing parameter, the second processing parameter, the first target value and/or the second target value can be selected by means of an operating and/or display device.

With the invention, a cooking apparatus with a processing chamber, a processing device comprising a heating device, a cooling device, a moisture feed device, a moisture removal device, a fluid feed device, a fluid removal device, a fan device, a circulation device and/or a cleaning device and with at least a sensing device, an operating and/or display device and a control or regulating device for implementing a method according to the invention is also provided.

The invention is thus based on the surprising insight that in addition to control on the basis of a comparison between the target and actual values, e.g., in a cooking process, a control can also be activated in an energy saving mode, which makes it possible that at the end of a cooking step, for example, residual heat or residual humidity can be used for a subsequent cooking step without actively having to feed additional heat or moisture to a processing chamber in which an item of food to be cooked is being cooked. Here, account is particularly taken of whether the subsequent cooking step comprises a lower, equal or higher target value for e.g. the temperature or humidity than the cooking step to be controlled, in order either to reduce the duration of the cooking step to be controlled or to refrain from further increasing the temperature or humidity in the processing chamber. As a result, energy is saved overall. In this connection, it should be noted that energy savings of between 2 and 4% already make a significant contribution to preserving resources.

In particular with gas cooking apparatuses with heat exchangers, the method according to the invention leads not only to a saving in energy, but also to a reduction in the number of operating cycles, which additionally has a beneficial effect on the working life of the components.

BRIEF DESCRIPTION OF THE DRAWINGS

Further features and advantages of the invention will be apparent from the following description in which embodiments of the invention are explained by way of example with reference to drawings.

DETAILED DESCRIPTION

Figure 1:
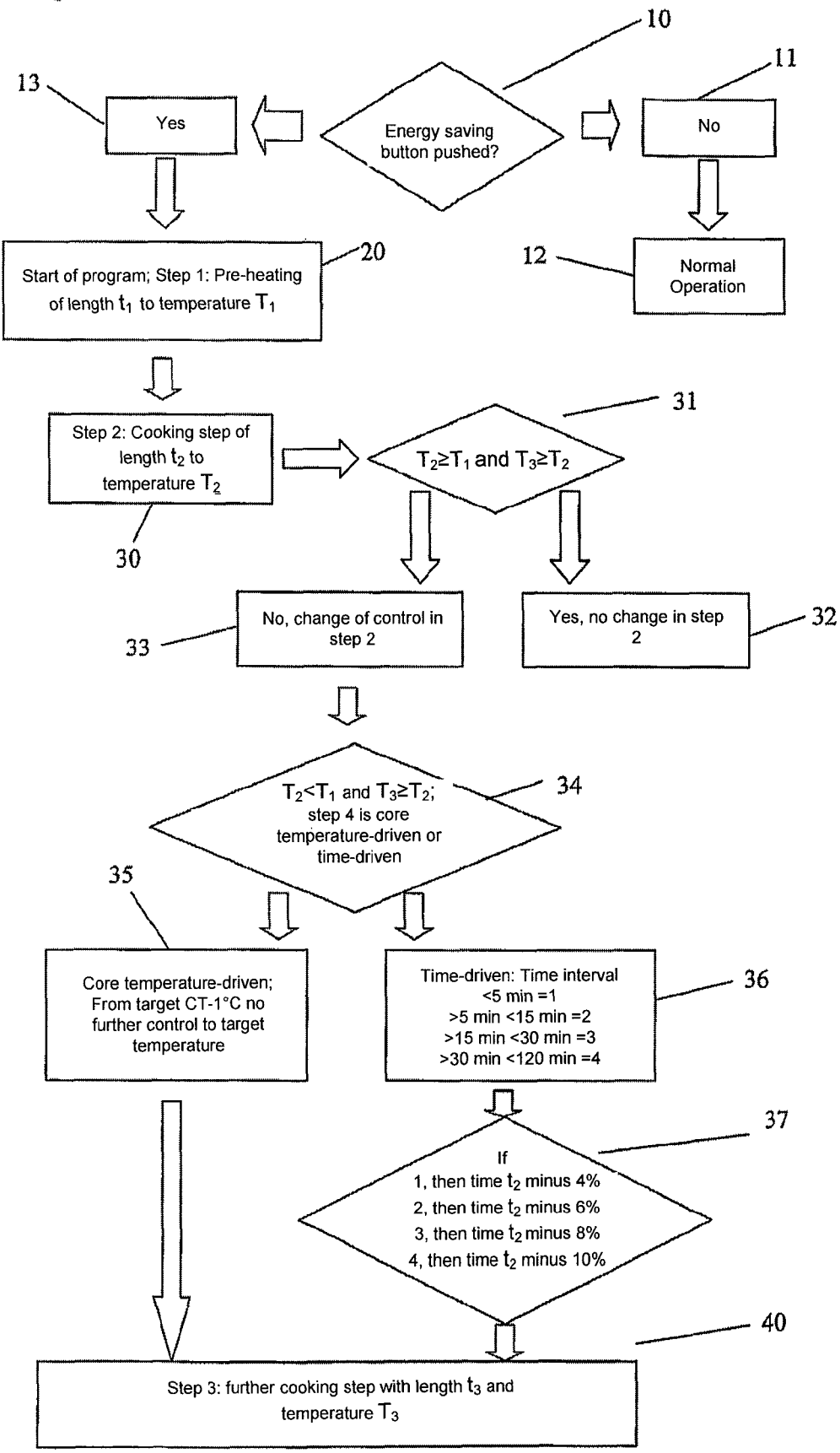
FIGS. 1 to 3 are flow charts of cooking methods to illustrate examples of the invention.

As can be seen in FIG. 1, a cooking apparatus can be operated either in the heretofore usual manner or in accordance with a method according to the invention. A decision can namely be made via an energy saving button (not shown) as to whether the method according to the invention should be carried out (see reference numeral 10). If the user opts for a conventional method (see reference numeral 11), the cooking method is controlled in the known manner (see reference numeral 12) such as is described e.g. in DE 197 18 389 A1. If however the energy saving button is activated by the user (see reference numeral 13), the method according to the invention begins, which comprises a plurality of cooking steps, wherein each step is assigned a time duration t and a temperature T of the heat medium in a cooking chamber of a cooking apparatus, not shown, for example comprising a pre-heating step ($t_1$, $T_1$), a first cooking step ($t_2$, $T_2$) and a second cooking step ($t_3$, $T_3$). Thus, a first step can be the pre-heating step $t_1$ (see reference numeral 20) in order to attain a required pre-heating temperature $T_1$ at the end of the pre-heating step $t_1$. Usually, the request to load the cooking chamber with an item of food to be cooked, not shown, is displayed on a display and operating device, not shown. If loading has been controlled accordingly, the second step of the cooking program begins, which is a first cooking step of the length $t_2$ and the temperature $T_2$ (see reference numeral 30). In this second step a control or regulating device, not shown, checks whether $T_2$ is higher than, equal to or lower than a temperature $T_1$ of the first step, and higher than, equal to or lower than a temperature $T_3$ of a third step, which is the second cooking step (see reference numeral 31). If $T_2 \geq T_1$ and $T_3 \geq T_2$, the second step continues without change (see reference numeral 32), whereas already if $T_2 < T_1$ and $T_3 \geq T_2$, an additional control takes effect (see reference numeral 33). The additional control in turn depends on whether during step 2 a core temperature-driven or time-driven control of the cooking process takes place (see reference numeral 34). If the first cooking step is core temperature-driven, wherein control is to a target core temperature, the control concerned for example already ended when the actual core temperature is 1° C. below the target core temperature (see reference numeral 35). However, if alternatively the first cooking step is time-driven, this can lead to a reduction in the length $t_2$ depending on the length $t_2$ itself (see reference numerals 36 and 37). A transition is then made from step 2 to step 3, which is the second cooking step (see reference numeral 40). FIG. 1 thus shows a part of a cooking method in which energy is then saved in a first cooking step, here step 2, when at the beginning of the first cooking step (shown here by pre-heating in step 1), a cooking chamber temperature $T_1$ occurs in the cooking chamber which lies above the cooking chamber temperature $T_2$ required for the first cooking step. Further energy saving according to the invention, not shown, is achieved when for the second cooking step, here step 3, a cooking chamber temperature $T_3$ is specified which is lower than the cooking chamber temperature $T_2$ in the first cooking step, here step 2, wherein in both cases when energy is saved, either a control or immediately the complete first cooking step can be terminated prematurely.

Figure 2:
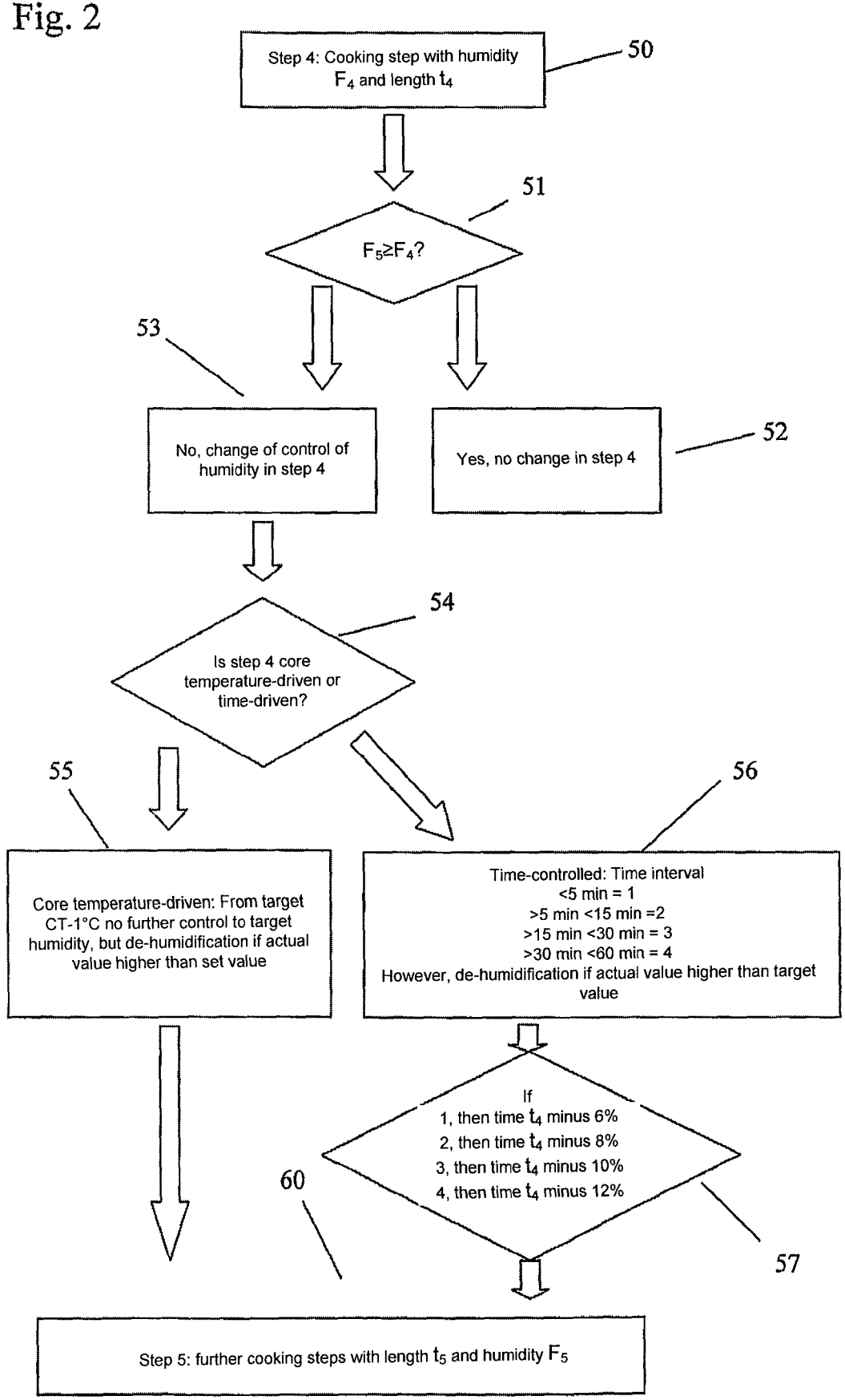

FIG. 2 shows alternative cooking process steps, in which humidity control takes place with additional cooking steps. More specifically, a step 4 is provided here, which is a further, first cooking step, which is assigned a target value of the humidity $F_4$ and a target length $t_4$ (see reference numeral 50), and a further second cooking step, in a step 5, in which a target value of the humidity $F_5$ should occur for a set length $t_5$ (see reference numeral 60). In a next step 5, it is therefore checked as to whether the humidity $F_5$ which is assigned to the subsequent step, i.e. the second cooking step, is higher than or lower than or equal to $F_4$ (see reference numeral 51). If $F_5 \geq F_4$, no additional control in the sense of the present invention takes place (see reference numeral 52). In other cases, the additional control described is conducted (see reference numeral 53). This additional control now in turn depends on whether in step 4, a core temperature or time regulation takes place (see reference numeral 54). If a core temperature regulation takes place, then from that point in time, control of the actual humidity to the target humidity can be ended when the actual core temperature is 1° C. below the target core temperature (see reference numeral 55). If by contrast step 5 is a time-driven method, a shortening of the length $t_4$ results, depending on the size of $t_4$ (see reference numerals 56 and 57). $t_4$ is thus shortened e.g. by 10% when 30 minutes $< t_4 <$ 120 minutes. Furthermore, energy savings analogous to those shown in FIG. 1 are achieved by taking into account the humidity in the cooking chamber at the start of the additional, first cooking step in step 4. Finally, a transition is made to step 5 (see reference numeral 60).

Figure 3:
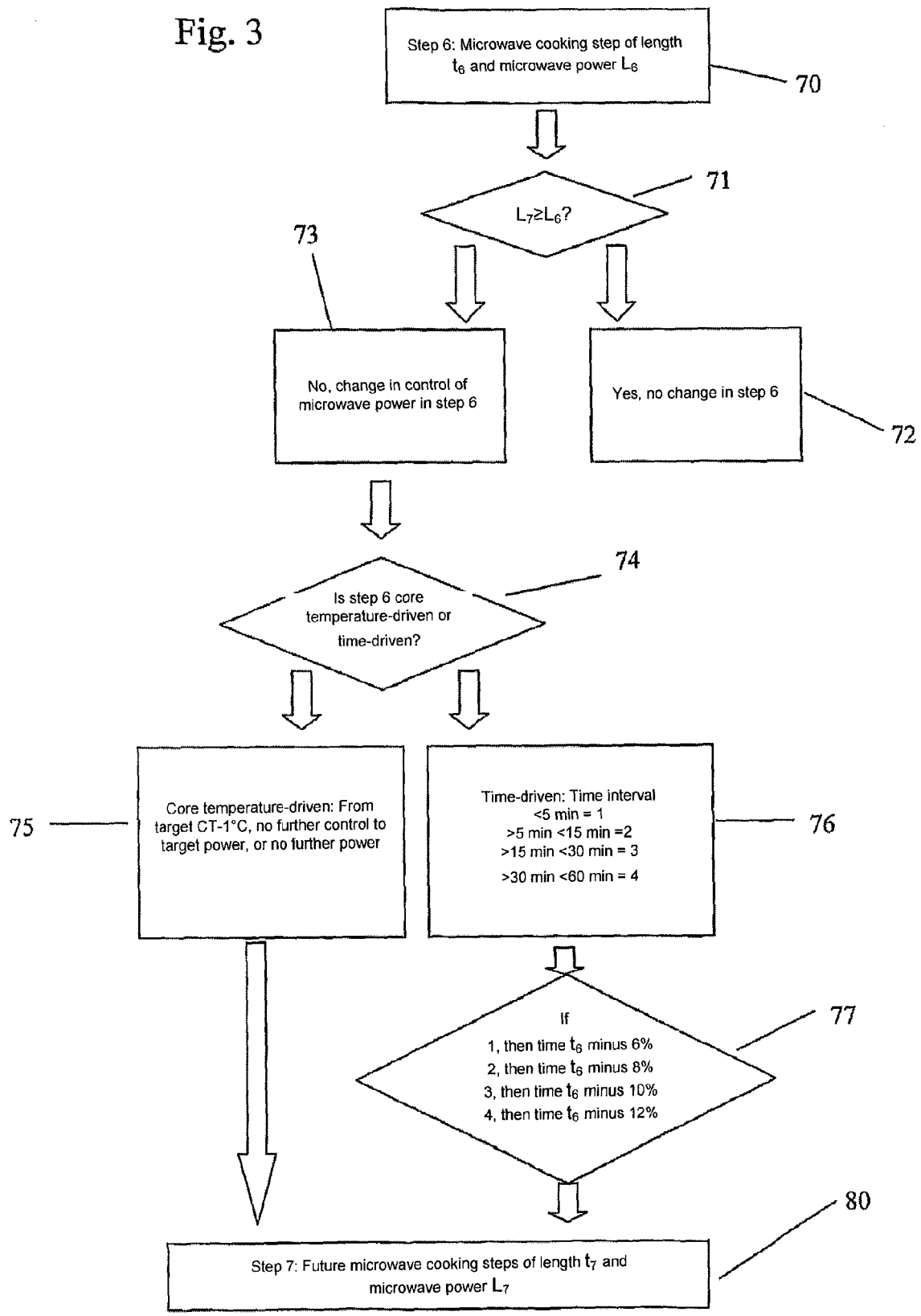

A further alternative for operations of a cooking method according to the invention is shown in FIG. 3. These operations are a part of a cooking method in which a microwave generator is used for the first time. More precisely, step 6 can be a first microwave cooking step, in which the microwave generator is switched on with a microwave power $L_6$, and over a length $t_6$, wherein $L_6$ and $t_6$ are specified as target values (see reference numeral 70). First, a check is made as to whether the microwave power $L_7$ of a second microwave cooking step (see reference numeral 80) is higher than, lower than or equal to $L_6$ (see reference numeral 71). If it is the case that $L_7 \geq L_6$, no additional control takes place (see reference numeral 72). In other cases, a first additional control according to the invention is implemented (see reference numeral 73) in which account is taken of the fact that prior to the first microwave cooking step, no microwave power was radiated into the processing chamber, and in addition, a differentiation is in turn to be made as to whether in step 6 a core temperature control or a time control is conducted (see reference numeral 74). If for example core temperature control is conducted, control of the power of the microwave generator can be ended when the actual core temperature value is 1° C. below the target core temperature value (see reference numeral 75). If by contrast, time control is conducted, t6 is shortened depending on the magnitude of $t_6$ (see reference numerals 76 and 77). Finally, a transition is made to step 7, which is the second microwave cooking step.

A method according to the invention is for example suitable when cooking chicken drumsticks, which is usually subdivided into four steps, as follows:

| Step 1 | Pre-heating | 160° C. | 80% humidity | |
| Step 2 | Combination | 140° C. | 80% humidity | 8 mins. |
| Step 3 | Combination | 180° C. | 60% humidity | 12 mins. |
| Step 4 | Hot air | 220° C. | 0% humidity | 10 mins. |

Here, energy optimization is possible in steps 2 and 3, e.g. in the manner described with reference to FIG. 1 or 2.

Cooking roast ham can also be energy optimized according to the invention, however. Here, the following four steps are used:

| Step 1 | Pre-heating | 130° C. | 90% humidity | |
| Step 2 | Combination | 120° C. | 90% humidity | CT 60° C. |
| Step 3 | Combination | 100° C. | 90% humidity | CT 70° C. |
| Step 4 | Hot air | 180° C. | 20% humidity | CT 73° C. |

For example, step 2 can use energy optimization as described with reference to FIG. 1, and step 3 can use energy optimization as described with reference to FIG. 2.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting.

It is claimed:

1. A method for guiding at least one food treatment process in a food treatment device, having a treatment chamber, at least one treatment device and a control or regulating device, in order to save energy, the method comprising:
   using a food treatment process that is divided into a plurality of treatment steps, one of which is selected to be the first treatment step directly followed by a second treatment step,
   applying at least one of dry heat, moisture or microwaves to food at least during the first treatment step through the treatment device for cooking said food during the food treatment process within the treatment chamber,
   assigning a first target value to a treatment parameter for the first treatment step and a second target value to the treatment parameter for the second step at the beginning of the process using at least in part the control or regulating device, capturing an actual value of the treatment parameter during the first treatment step by at least one sensor device, and controlling the treatment parameter so that the actual value falls together with the first target value during at least a part of the first treatment step, wherein the treatment parameter is determined from at least one of a first variable relating to the climate in the treatment chamber, determined from the temperature, the moisture or the volume flow of the atmosphere within the treatment chamber, and a second variable relating to the treatment device, determined from an energy supply to the treatment device, wherein the control or regulating device provides: reducing the duration of the first treatment step, or reducing the duration of the regulation of the actual value of the treatment parameter in the first treatment step relative to the duration of the first treatment step, or shutting down the treatment device during at least a part of the first treatment step, or combinations thereof;

in case the second target value of the treatment parameter is lower than the first target value of the treatment parameter, such that at the end of the first treatment step residual heat or residual moisture can be used for the second treatment step.

2. The method according to claim 1, wherein
the reducing of the duration of regulation in the first treatment step or the reducing of the duration of the first treatment step depends on the difference between the first target value and the second target value.

3. The method according to claim 1, wherein
the reducing of the duration of regulation in the first treatment step is selected in cases when the food treatment process is core temperature-driven.

4. The method according to claim 1, wherein
the treatment device can be switched off during at least a part of the first step.

5. The method according to claim 1, wherein
the treatment parameter is determined from a first variable, a second variable, a third variable, and a fourth variable, the first variable relating to the climate in the treatment chamber, is determined from the temperature, the moisture or the volume flow of the atmosphere within the treatment chamber;

the second variable relating to the treatment device, is determined from an energy supply to the treatment device;

the third variable is determined from the degree of cooking of the food, wherein the degree of cooking is determined from the core temperature, the cooking variable, the pH value or the degree of browning, wherein the fourth variable is determined from the composition of a cleaning liquid which is circulated in or through the processing chamber.

6. The method according to claim 5, wherein
the shortening of the duration of control in the first treatment step or the switching off of the treatment device during at least a part of the first treatment step occurs in dependence on the first, second, third or fourth variable prior to the first step.

7. The method according to claim 5, wherein
an energy saving mode, the food treatment process, the first treatment step, the second treatment step, the first variable, the second variable, the third variable, the fourth variable, the first processing parameter, the first target value or the second target value is selected by a user through an operating or display device.

* * * * *